United States Patent
Errington

(10) Patent No.: US 8,634,864 B2
(45) Date of Patent: *Jan. 21, 2014

(54) MESSAGING SYSTEM AND METHOD

(75) Inventor: Oliver Boyd Errington, Newport (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,108

(22) Filed: Sep. 7, 2012

(65) Prior Publication Data

US 2012/0329493 A1 Dec. 27, 2012

Related U.S. Application Data

(63) Continuation of application No. 12/485,667, filed on Jun. 16, 2009, now Pat. No. 8,285,313.

(30) Foreign Application Priority Data

Jun. 16, 2008 (AU) ................................ 2008903059

(51) Int. Cl.
*H04W 4/00* (2009.01)
(52) U.S. Cl.
USPC ..................... 455/466; 455/412.1; 455/414.1; 455/550.1; 455/566; 345/168; 345/169; 345/632; 345/636
(58) Field of Classification Search
USPC ............. 455/412.1, 412.2, 414.1, 414.2, 466, 455/550.1, 566
See application file for complete search history.

(56) References Cited

U.S. PATENT DOCUMENTS

| | | | |
|---|---|---|---|
| 4,829,519 A | 5/1989 | Scotton et al. |
| 5,142,539 A | 8/1992 | Dahlin et al. |
| 5,317,671 A | 5/1994 | Baker et al. |
| 5,581,547 A | 12/1996 | Umeda et al. |
| 6,044,248 A | 3/2000 | Mochizuki et al. |
| 6,445,396 B1 | 9/2002 | Suzuki |
| 6,518,919 B1 | 2/2003 | Durst et al. |
| 6,657,660 B2 | 12/2003 | Shiota et al. |
| 7,053,753 B2 | 5/2006 | Kacalek et al. |
| 2002/0006117 A1 | 1/2002 | Duske, Jr. et al. |
| 2002/0009101 A1 | 1/2002 | Niemela |
| 2002/0077121 A1 | 6/2002 | Ketola |
| 2002/0136242 A1 | 9/2002 | Niemela |

(Continued)

FOREIGN PATENT DOCUMENTS

| CA | 1276687 | 11/1990 |
|---|---|---|
| CA | 2604069 | 11/1999 |

(Continued)

OTHER PUBLICATIONS

United States Patent and Trademark Office, "Notice of Allowance," issued in connection with U.S. Appl. No. 12/485,667, mailed on Jun. 8, 2012, 18 pages.

(Continued)

*Primary Examiner* — Olumide T Ajibade Akonai
(74) *Attorney, Agent, or Firm* — Hanley, Flight & Zimmerman, LLC

(57) ABSTRACT

A messaging method using a mobile user terminal, the method including: creating, at the mobile user terminal, at least one graphical messaging symbol adapted to convey a meaning to a message recipient; preparing message content including at least one of the created graphical messaging symbols using the mobile terminal; and sending the message to a recipient via a communication network.

30 Claims, 7 Drawing Sheets

(56) References Cited

U.S. PATENT DOCUMENTS

| | | |
|---|---|---|
| 2002/0145045 A1 | 10/2002 | Waxelbaum |
| 2002/0147660 A1 | 10/2002 | Indence |
| 2003/0003936 A1 | 1/2003 | Tighe |
| 2003/0021398 A1 | 1/2003 | Donnelly et al. |
| 2003/0071126 A1 | 4/2003 | Waxelbaum |
| 2003/0201931 A1 | 10/2003 | Durst et al. |
| 2003/0210280 A1 | 11/2003 | Baker et al. |
| 2004/0248599 A1 | 12/2004 | Lai et al. |
| 2005/0107099 A1 | 5/2005 | Schutze et al. |
| 2005/0143102 A1 | 6/2005 | McEvilly et al. |
| 2005/0186968 A1 | 8/2005 | Durst et al. |
| 2005/0215271 A1 | 9/2005 | Sim et al. |
| 2006/0085731 A1 | 4/2006 | Cui et al. |
| 2006/0107238 A1 | 5/2006 | Gold |
| 2007/0101005 A1 | 5/2007 | Shim et al. |
| 2007/0294725 A1 | 12/2007 | Cohen et al. |
| 2008/0132254 A1 | 6/2008 | Graham et al. |
| 2009/0313099 A1 | 12/2009 | Errington |

FOREIGN PATENT DOCUMENTS

| | | |
|---|---|---|
| CA | 2342978 | 3/2000 |
| CA | 2541620 | 10/2007 |
| CN | 1308471 | 8/2001 |
| CN | 1380633 | 11/2002 |
| CN | 1494349 | 5/2004 |
| CN | 1554994 | 12/2004 |
| CN | 1567937 | 1/2005 |
| CN | 1571544 | 1/2005 |
| CN | 1684536 | 10/2005 |
| CN | 1913546 | 2/2007 |
| CN | 1952973 | 4/2007 |
| DE | 19720594 | 1/1999 |
| EP | 0720406 | 7/1996 |
| EP | 1246478 | 10/2002 |
| EP | 1372323 | 12/2003 |
| EP | 1467581 | 10/2004 |
| EP | 1505485 | 2/2005 |
| EP | 1677554 | 7/2006 |
| EP | 1764985 | 3/2007 |
| FR | 2534096 | 4/1984 |
| FR | 2835686 | 8/2003 |
| GB | 2350994 | 12/2000 |
| GB | 2355154 | 4/2001 |
| GB | 2361602 | 10/2001 |
| JP | 2094825 | 4/1990 |
| JP | 2213237 | 8/1990 |
| JP | 9181802 | 7/1997 |
| JP | 11134268 | 5/1999 |
| JP | 11252252 | 9/1999 |
| JP | 2000209662 | 7/2000 |
| JP | 2000270075 | 9/2000 |
| JP | 2000312385 | 11/2000 |
| JP | 2003110597 | 4/2003 |
| JP | 2007124666 | 5/2007 |
| JP | 2007233439 | 9/2007 |
| JP | 2007233442 | 9/2007 |
| JP | 2007235206 | 9/2007 |
| KR | 100293407 | 4/2001 |
| KR | 20010026482 | 4/2001 |
| KR | 20010029765 | 4/2001 |
| KR | 100295959 | 5/2001 |
| KR | 20010067181 | 7/2001 |
| KR | 20010074009 | 8/2001 |
| KR | 20020001660 | 1/2002 |
| KR | 20020008547 | 1/2002 |
| KR | 20020013108 | 2/2002 |
| KR | 20020014108 | 2/2002 |
| KR | 100332201 | 3/2002 |
| KR | 20020020317 | 3/2002 |
| KR | 20020023479 | 3/2002 |
| KR | 20020030231 | 4/2002 |
| KR | 20020031537 | 5/2002 |
| KR | 20020044944 | 6/2002 |
| KR | 20020059165 | 7/2002 |
| KR | 20020066438 | 8/2002 |
| KR | 20020066811 | 8/2002 |
| KR | 20020080164 | 10/2002 |
| KR | 20020084379 | 11/2002 |
| KR | 20020091920 | 12/2002 |
| KR | 20030026678 | 4/2003 |
| KR | 20030029560 | 4/2003 |
| KR | 20030034835 | 5/2003 |
| KR | 20030049544 | 6/2003 |
| KR | 20030092658 | 12/2003 |
| KR | 20040025438 | 3/2004 |
| KR | 20040026804 | 4/2004 |
| KR | 20040040549 | 5/2004 |
| KR | 20040062226 | 7/2004 |
| KR | 20040064031 | 7/2004 |
| KR | 20040084546 | 10/2004 |
| KR | 20040098966 | 11/2004 |
| KR | 20040100243 | 12/2004 |
| KR | 20040103665 | 12/2004 |
| KR | 20040110886 | 12/2004 |
| KR | 20050012504 | 2/2005 |
| KR | 20050019175 | 3/2005 |
| KR | 20050068380 | 7/2005 |
| KR | 20050095335 | 9/2005 |
| RU | 2161873 | 1/2001 |
| RU | 2190309 | 9/2002 |
| RU | 2301451 | 6/2007 |
| TW | 241112 | 10/2005 |
| UA | 73342 | 2/2004 |
| WO | 9730556 | 8/1997 |
| WO | 9800992 | 1/1998 |
| WO | 9819433 | 5/1998 |
| WO | 9856197 | 12/1998 |
| WO | 02089335 | 11/2002 |
| WO | 02102042 | 12/2002 |
| WO | 2005029431 | 3/2005 |
| WO | 2005033956 | 4/2005 |
| WO | 2006070241 | 7/2006 |

OTHER PUBLICATIONS

United States Patent and Trademark Office, "Non-Final Office Action," issued in connection with U.S. Appl. No. 12/485,667, mailed on Dec. 15, 2011, 31 pages.

MESSAGING SYSTEM AND METHOD

CROSS-REFERENCE TO RELATED APPLICATIONS

The present application claims the benefit of priority as a continuation to U.S. patent application Ser. No. 12/485,667, filed on Jun. 16, 2009, entitled "MESSAGING SYSTEM AND METHOD", which claims the benefit of priority to Australian Provisional Patent Application No. 2008903059, filed on Jun. 16, 2008, entitled "MESSAGING SYSTEM AND METHOD", each of which is herein incorporated by reference in its entirety.

FIELD OF THE INVENTION

The field of the invention is methods and systems for communication between people via a communication network. An example of an application of an embodiment is exchanging messages between people using mobile phones.

BACKGROUND OF THE INVENTION

Sending messages between people via a communication network using text and images is known. Known messaging technologies include short messaging service (SMS) messages, multimedia messaging service (MMS), enhanced messaging service (EMS) and e-mail.

There is an unmet need for systems and methods for messaging which enable users to communicate in an effective and entertaining manner.

SUMMARY OF THE INVENTION

According to one aspect there is provided a messaging method using a mobile user terminal, the method including:

creating, at the mobile user terminal, at least one graphical messaging symbol adapted to convey a meaning to a message recipient;

preparing message content including at least one of the created graphical messaging symbols using the mobile terminal; and sending the message to a recipient via a communication network.

Creating a graphical symbol in one embodiment includes:

selecting two or more base symbols from a defined base symbol set; and combining the two or more base symbols in a manner adapted to convey a meaning to a message recipient to form a graphical messaging symbol.

In another embodiment creating a graphical messaging symbol includes:

accessing a pre-existing graphical symbol adapted to convey a first meaning to a recipient; and modifying the pre-existing graphical symbol to create a graphical messaging symbol.

The modifying can include combining the pre-existing graphical messaging symbol with one or more base symbols.

Base symbols can be selected from a base symbol set including one or more of: geometric shapes, lines, mathematical symbols, characters, and predefined symbols.

In an embodiment accessing a pre-existing graphical symbol involves looking up the pre-existing graphical symbol in a symbol library accessible via a communication network.

An embodiment further includes storing a created graphical messaging symbol in a symbol library. This embodiment can further include:

making created graphical messaging symbols available for downloading from the symbol library via a network; and monitoring downloading of symbols from the graphical symbol library.

Monitoring downloading of graphical symbols can include incrementing a download counter value of a download counter associated with a graphical symbol or set of graphical symbols for each download.

In an embodiment the popularity of symbols or sets of symbols are ranked and symbols presented in the library based on popularity.

In an embodiment creator data is stored for each created graphical messaging symbol, and the method further includes reading creator data for a downloaded graphical symbol and incrementing a creator counter value of a creator counter for the creator of the graphical symbol. One or more prizes can be awarded to symbol creators based on creator counter values.

Prizes awarded can be credits, stored in a user account, and redeemable for access to voice, data and messaging services.

According to another embodiment there is provided a mobile user terminal having a processor adapted to execute a set of instructions to enable a user of the terminal to:

create at least one graphical messaging symbol adapted to convey a meaning to a message recipient;

prepare message content including at least one of the created graphical messaging symbols; and send the message to a recipient via a communication network.

A user terminal, as described above, can be provided with a defined base symbol set stored in memory accessible by the mobile terminal processor and the processor is adapted to execute instructions to enable a user to create a graphical symbol by:

selecting two or more base symbols from the base symbol set; and combining the two or more base symbols in a manner adapted to convey a meaning to a message recipient to form a graphical messaging symbol.

A user terminal, as described above, can be adapted to enable a user to create a graphical messaging symbol by:

accessing a pre-existing graphical symbol adapted to convey a first meaning to a recipient; and modifying the pre-existing graphical symbol to create a graphical messaging symbol. The new graphical messaging symbol may be adapted to convey a second meaning to a recipient.

Modifying the pre-existing graphical symbol can include combining the pre-existing graphical messaging symbol with one or more base symbols.

In an embodiment the user terminal is adapted to access a symbol library via a communication network to look up a pre-existing graphical symbol stored therein.

In another embodiment the user terminal is further adapted to store a created graphical messaging symbol in a network accessible symbol library.

According to another aspect there is provided a messaging system including:

a network accessible symbol library for storing graphical messaging symbols; and at least one mobile user terminal having a processor adapted to execute a set of instructions to enable a user to:

create at least one graphical messaging symbol adapted to convey a meaning to a message recipient;

prepare message content including at least one of the created graphical messaging symbols;

send the message to a recipient via a communication network; and store created graphical messaging symbols in the symbol library.

The user terminal can also be adapted to access, via the communication network, graphical messaging symbols stored in the symbol library, and download one or more graphical symbols to the user terminal for use in preparing message content or creating further graphical symbols.

In an embodiment the symbol library further includes a monitor for monitoring downloading of graphical messaging symbols from the symbol library. Monitoring downloading of graphical symbols can include incrementing a download counter value of a download counter associated with a graphical symbol or set of graphical symbols for each download.

The monitor can be further adapted to rank popularity of symbols or sets of symbols based on download counter values.

The system may be adapted to present symbols in the library based on popularity rankings.

An embodiment of the system further includes a subscriber register in data communication with the symbol library, wherein the subscriber register stores subscriber data of registered subscribers.

The symbol library can be adapted to store creator data for each created graphical messaging symbol, and wherein the monitor is adapted to read creator data for a downloaded graphical symbol and increment a creator counter value of a creator counter stored in the subscriber register as subscriber data for the creator of the graphical symbol.

Embodiment of the system can be further adapted to award one or more prizes to symbol creators based on creator counter values.

Prizes awarded can be credits added to a credit balance stored in the subscriber register as subscriber data for a subscriber whereby the credits are redeemable for access to voice, data and messaging services.

According to another aspect there is provided an application for execution by a mobile user terminal to adapt the user terminal to:

create at least one graphical messaging symbol adapted to convey a meaning to a message recipient;

prepare message content including at least one of the created graphical messaging symbols; and send the message to a recipient via a communication network.

BRIEF DESCRIPTION OF THE DRAWINGS

Certain embodiments will now be described by way of example only with reference to the accompanying drawings in which.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements is hereby expressly defined to include a tangible medium such as a memory, DVD, CD, etc. storing the software and/or firmware.

A messaging method and system are provided for messaging using a mobile user terminal. The method and system enable a user to create one or more graphical messaging symbol adapted to convey a meaning to a message recipient, using their mobile user terminal. Message content can then be prepared using at least one of the created graphical user symbols and sent to a recipient via a communication network.

Figure 1:
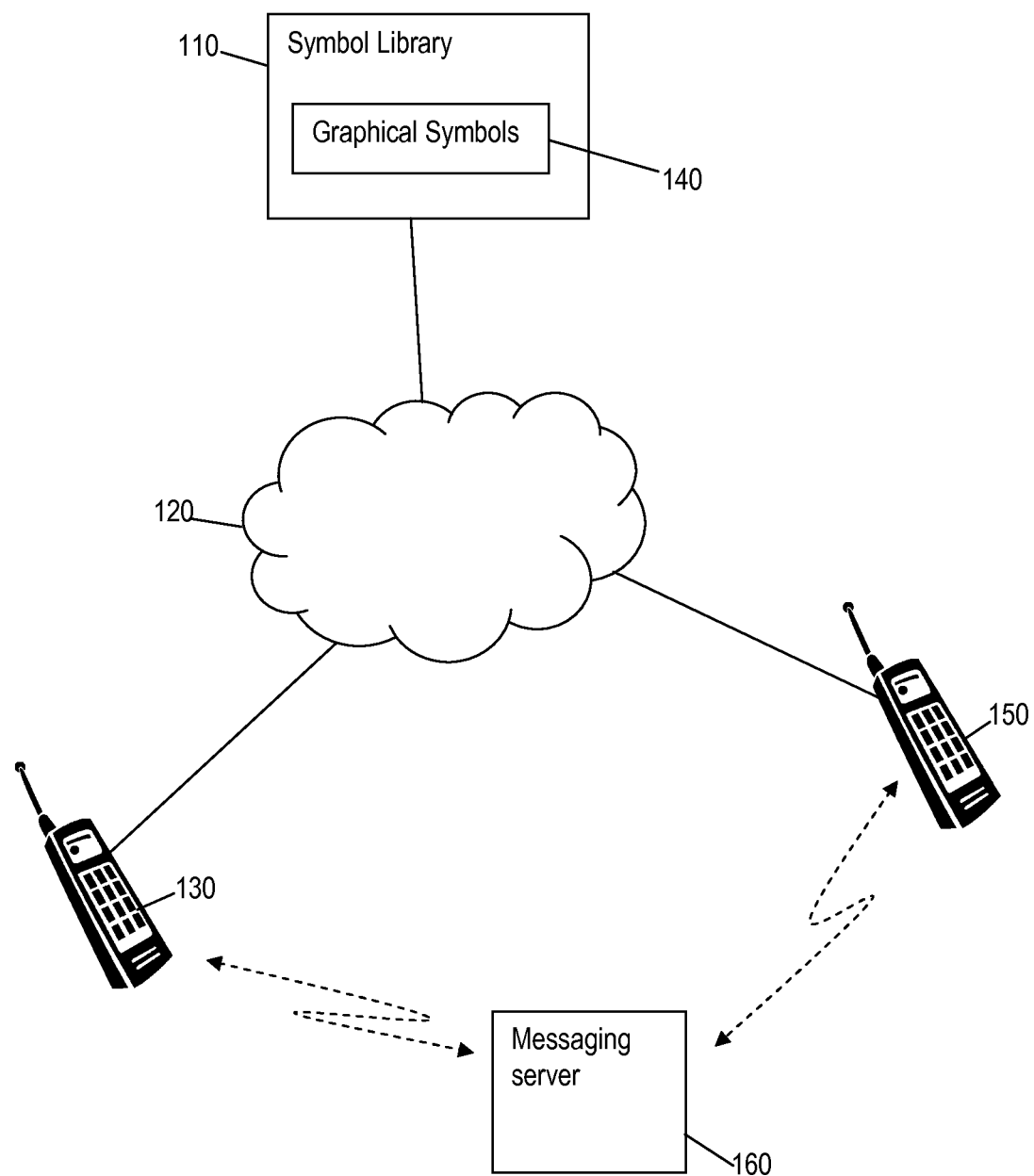
FIG. 1 illustrates an example of a system for messaging via a communication network.

In an embodiment as illustrated in FIG. 1 a user can create graphical messaging symbols using their user terminal 130 such as a mobile phone, personal digital assistant or the like. The created symbols can be used to prepare message content for sending to a recipient user terminal 150 via a communication network messaging service 160. Graphical messaging symbols 140 can also be stored in a symbol library 110 which is accessible, via a communication network 120, by one or more user terminals 130 150.

Embodiments of the method and system can be adapted to use any messaging service compatible with graphical messaging symbols for the sending of messages between user terminals. For example embodiments are envisaged which employ known messaging services such as multimedia messaging service (MMS) or enhanced messaging service (EMS), however alternative messaging services are also envisaged. For example, instant messaging or e-mail are also envisaged as messaging services for which embodiments may be applied.

Figure 2:
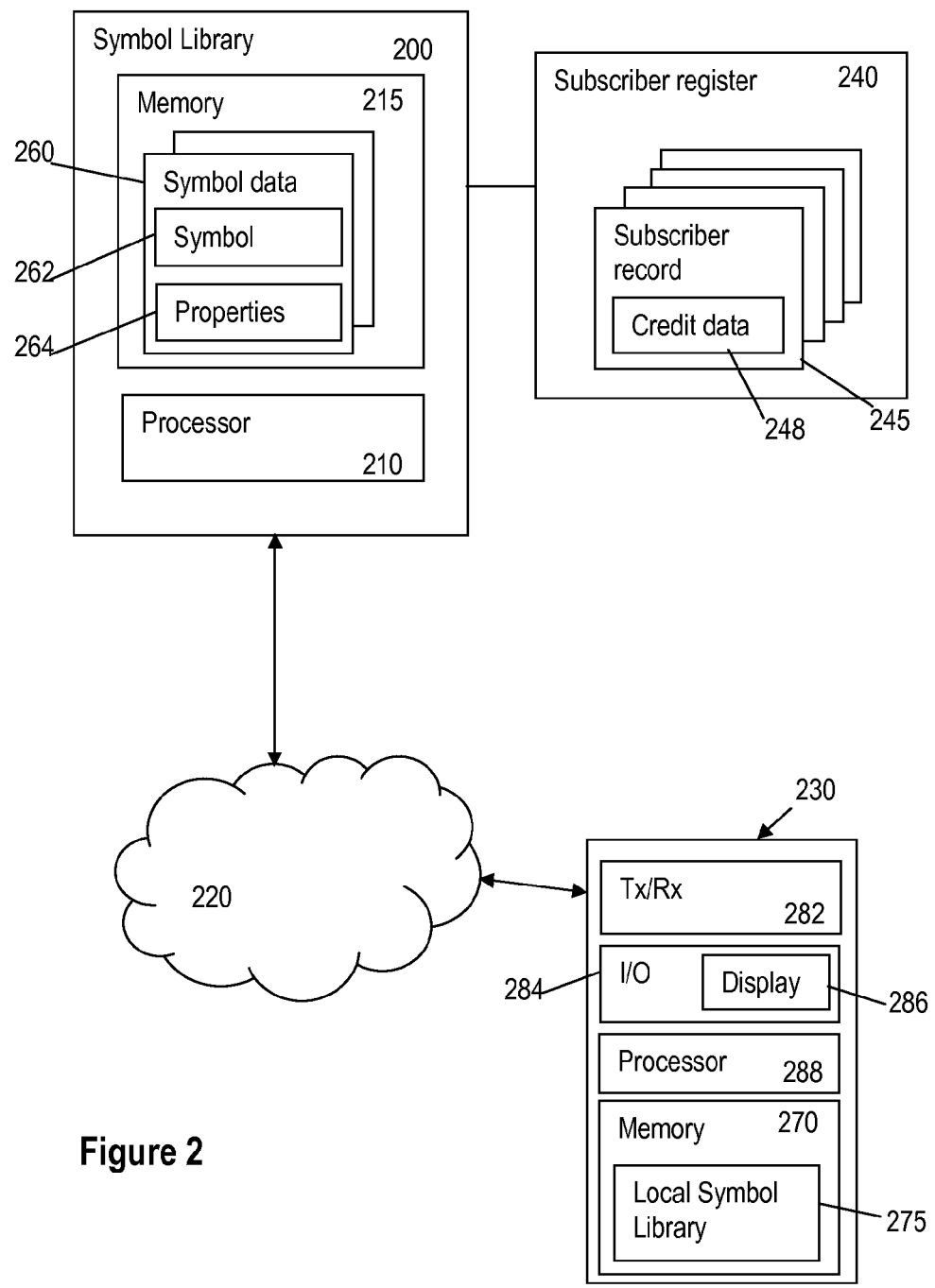
FIG. 2 shows block diagram illustrating an example of a messaging system enabling symbol generation by users.

An example of an embodiment of a messaging system is illustrated in FIG. 2. The messaging system includes a network accessible symbol library 200 and at least one mobile user terminal 230.

The symbol library 200 illustrated in FIG. 2 includes a memory 215 storing symbol data 260 for one or more graphical symbols 262, and a processor 210. The symbol data 260 includes the graphical messaging symbol 262 and can also include symbol property data 264 such as identification data for the symbol creator and one or more counters for monitoring symbol downloads. The processor 210 is adapted control the storing and access of symbol data 260 by user terminals 230 via a connected communication network 220. The processor can also monitor downloading of the graphical symbols and update any relevant download counters. The symbol library 200 may include a network server and database for storing symbol data.

A mobile user terminal 230 includes a transceiver 280 for transmitting data to and receiving data from the communication network 220, a user input and output interface 284, a processor 288 and memory 270. The user terminal can be any network connectable communication device, for example the user device may be a mobile phone, personal digital assistant etc.

The mobile user terminal 230 is adapted to enable a user to:

create at least one graphical messaging symbol adapted to convey a meaning to a message recipient;

prepare message content including at least one of the created graphical messaging symbols;

send the message to a recipient via a communication network; and store created graphical messaging symbols in the symbol library.

A software application can be downloaded to the user terminal memory 270 for execution by the processor 288 to adapt the user terminal for creating graphical messaging symbols and use the created symbols in messages. A local symbol library 275 may also be stored in the user terminal memory. The local symbol library can be used to store, symbols created by the user, downloaded from a network accessible symbol library 200 and base symbols which can be used for creating new graphical symbols.

The processor 288, is a processing device such as a microprocessor or the like, adapted to control user terminal functions and execute software programs stored in memory 270. The processor 288 and memory 270 architecture may vary depending on the type of user terminal. It should be appreciated by a skilled person that all possible hardware, firmware and software architectures for the mobile user terminal are contemplated within the scope of the present application.

The user input and output interface 284 typically includes a display 286 and any combination of interfaces in accordance with the style of device, for example keypad, keyboard, microphone, touch-screen, data input and output ports, image/video capture etc. A person skilled in the art will appreciate that any variation of user interface options are contemplated within the scope of this application.

Figure 3:
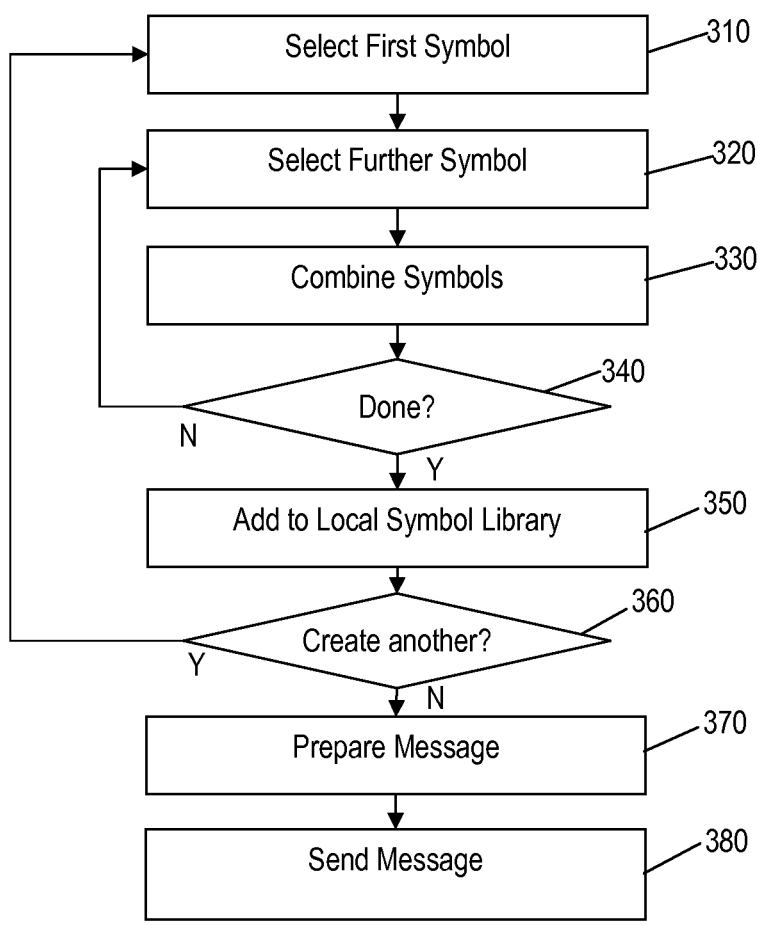
FIG. 3 is a flowchart illustrating an example of a messaging symbol generation and use process.

A user can create graphical messaging symbols using their mobile user terminal. An example of a procedure for creating graphical symbols is illustrated in FIG. 3. Using the graphical symbol creator provided on their mobile device, the user selects a first symbol 310. The first selected symbols may be a base symbol or a pre-existing graphical messaging symbol. For example a base symbol set can include basic geometric shapes such as circles, rectangles, lines, arcs and arrows and may also include some basic symbols which covey a generally recognised meaning, for example well known symbols such as those commonly used on signs.

The user can then select a further symbol 320 and combine the selected symbols 330. The combining the symbols entails arranging the symbols by the user in a manner adapted to convey a meaning. Combining the symbols may also involve resizing symbols, removing or obscuring parts of a symbol, and changing colours of symbols. It should be appreciated that the user can combine the symbols in any manner which conveys a meaning to a recipient.

In some cases a user may require more than two symbols to convey the desired meaning, in this case the user will continue to select further symbols 320 and further combine 330 these symbols. Once the graphical messaging symbol is created 340 the symbol can be stored in a local symbol library in user terminal memory 350 and the user can proceed to created further symbols 360 if desired. Once the user has created the desired symbols 360 the user proceeds to prepare a message 370 for sending, for example by selecting one or more graphical messaging symbols in a desired order and adding message recipient information. The prepared message is then sent 380 to the recipient via the communication network.

Figure 4A:
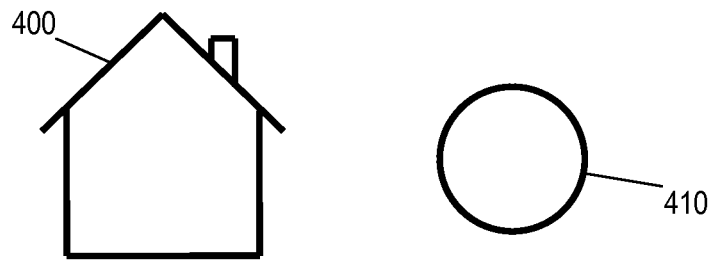
FIGS. 4a to 4d illustrate an example of symbol creation.
Figure 4B:
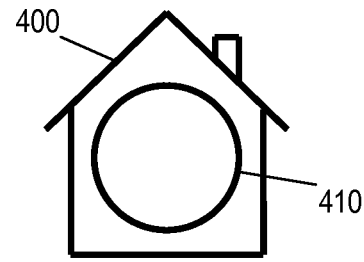
Figure 4C:
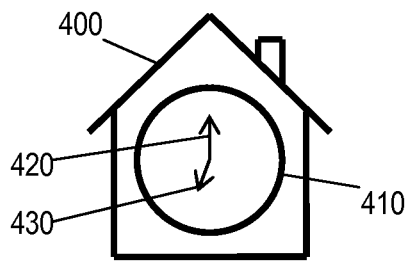
Figure 4D:
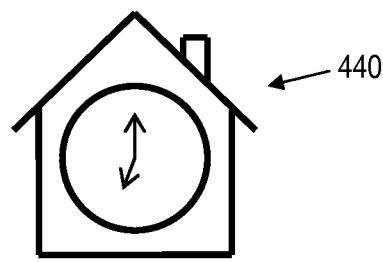

An example of creating a graphical messaging symbol by selecting two or more base symbols from a defined base symbol set and combining the two or more base symbols is illustrated in FIGS. 4a to 4d. In this example the user selects a first base symbol of an outline of a house 400 and another base symbol of a circle 410 as shown in FIG. 4a. The user then places the circle 410 inside the outline of the house 400 as shown in FIG. 4b. Two arrows 420 430 are then placed inside the circle to represent the hands of the clock, say showing seven o'clock, as illustrated in FIG. 4c. Thus, the base symbols of the house 400, circle 410 and two arrows 420 430 are combined to form a graphical symbol 440, as shown in FIG. 4d, to convey the meaning that the sender will be home at seven o'clock. It should be appreciated that the user could also generate the graphical symbol of the outline of a house using lines, if the house was not provided in the base symbol set.

Figure 5A:
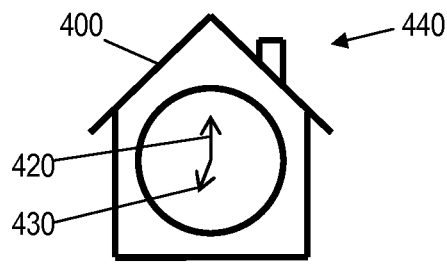
FIGS. 5a to 5c illustrate another example of symbol creation.
Figure 5B:
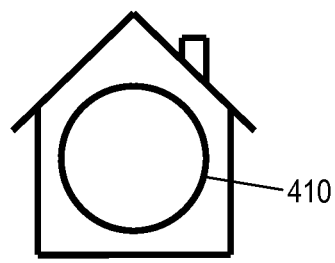
Figure 5C:
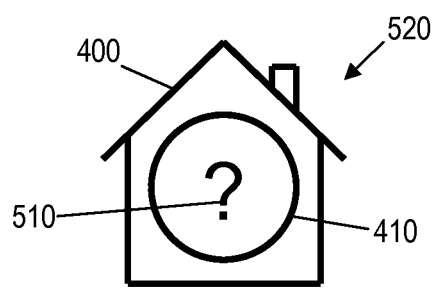

Another method of creating a graphical messaging symbol involves accessing a pre-existing graphical symbol adapted to convey a first meaning to a recipient, and modifying the pre-existing graphical symbol to create a graphical messaging symbol adapted to convey a second meaning to a recipient. For example, as illustrated in FIGS. 5a to 5c, a user can access the graphical symbol 440 meaning the sender will be home at seven o'clock, as described above. The user can then modify this symbol to remove the clock hands 420 430 leaving a blank clock face as shown in FIG. 5b. The user can then insert a question mark 510, which can be selected from a basic symbol set, in the centre of the clock face to create a new graphical symbol 520, as shown in FIG. 5d, to convey the question "what time will you be home?" to the receiver.

It should be appreciated that the meaning conveyed by a graphical symbol may vary for different recipients based on the context of the message or based on a common understanding between the sender and recipient. For example the graphical symbol 520 shown in FIG. 5d may also be used to convey the meaning "I don't know what time I'll be home" for example if returned in reply to a first message containing this same graphical symbol.

Once created, graphical symbols can be stored in a local symbol library in the user terminal memory so the symbol can be used by the user for subsequent messages. Created symbols can also be stored in a network accessible symbol library 200 to make the symbols accessible to other users. The symbol library 200 can also be adapted to store properties associated with each symbol. For example, the symbol properties can include creation data, access restrictions, classification data etc. Creation data can include data such as the symbol creator, a creation date, predecessor symbol data where the symbol is a variation of a previously created symbol etc. Access data can include data such as whether access to symbols is restricted, say to specified users or groups, or if a fee is playable for downloading the symbol. For example, a creator may specify that a symbol is only accessible to members of a particular group or that the symbol is open for all to use. Classification data can include data such as symbol subject key words or symbol group identifiers which can be used for searching for symbols based on subject, or downloading multiple symbols based on symbol group.

In an embodiment a subscriber register 240 is also provided. In this embodiment users subscribe to obtain access to the symbol library and subscriber data is stored in subscriber records 245. A data connection can exist between the subscriber register 240 and the symbol library 200 to enable the symbol library processor 210 to access and update subscriber records 245.

In an embodiment the symbol library 200 and subscriber register 240 may be implemented commonly, for example where the symbol library 200 and subscriber register 240 are implemented as functions of a network server. The subscriber register may also be used to subscribe to services in addition to the graphical messaging service, for example a player may subscriber to voice services, data services, and other services such as one or more game services.

The subscriber register may also be adapted to manage subscribers' access to services through use of credits. A subscriber record 245 can store credit data 248 including a subscriber's credit balance value. A credit value may be deducted from this balance to pay for access to services offered through the subscription. The credit balance value can be increased through subscription payments or purchasing additional credit for the service provider. In some embodiments prizes are awarded to creators of graphical symbols as credit added to the subscriber's credit balance. The actual credit value awarded as a prize for a subscriber can be a standard prize value or determined based on the popularity of symbols created by the subscriber. When a prize is awarded for a subscriber, the prize credit value is added to the credit balance value of their subscriber account. This accumulated credit may then be used to pay for other services offered through the subscription.

Figure 6:
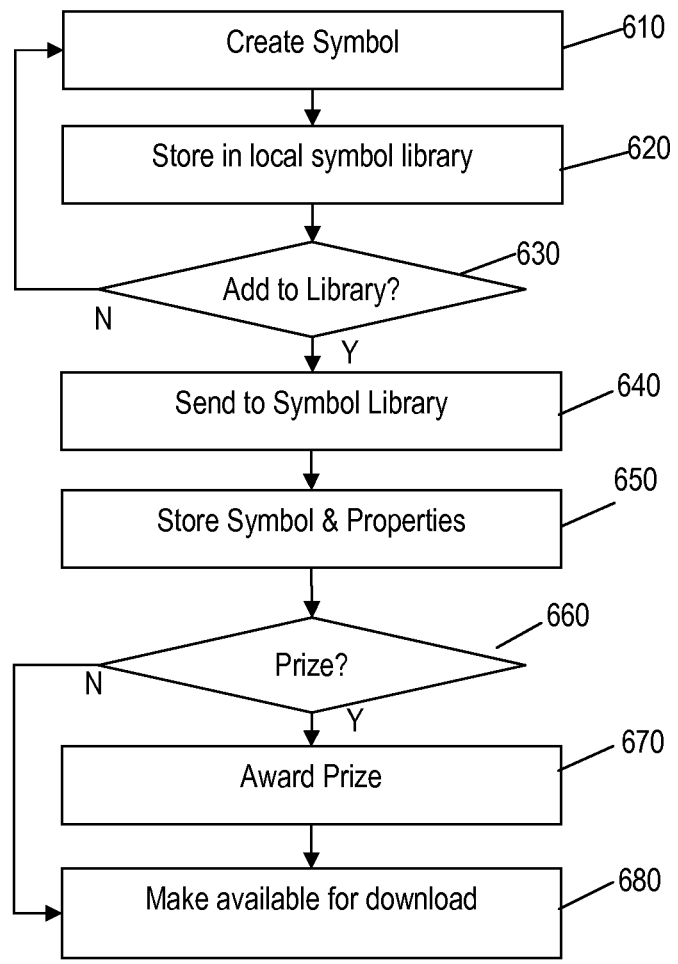
FIG. 6 is a flowchart of an example of a process for uploading a created symbol to a network accessible symbol library.

An example of a procedure for storing created symbols in a network accessible symbol library is illustrated in FIG. 6. A user creates a graphical messaging symbol 610 using their user terminal. The created symbol is stored in a local symbol library 620 in user terminal memory. The user can select an option to also store the created symbol in the network accessible symbol library 630, for example implemented using a network server and database. The symbol is sent to the symbol library 640 via the communication network. Symbol properties, such as creator identification data and any symbol classification data can also be sent with the symbol data or can be added once the symbol data is received at symbol library. For example, the creator identification data may be the sender extracted from transmission data for the symbol data. The symbol properties can be stored in the symbol record in the database. Some or all symbol properties may also be attached to the graphical symbol data as metadata for downloading along with the symbol data. Symbols may also go through an approval and classification process before they are stored in the symbol library and symbols properties may also be added during this process. For example, symbols may be reviewed and classified into symbols groups based on subject matter for searching purposes, and group or searching key words added as symbol properties. Data such as a download charge for a symbol may also be added to the symbol properties. Symbols may also be reviewed to ensure no derogatory, licentious, malicious or vilifying symbols are stored in the symbol library, and any such symbols may be rejected. Penalties, such a fines or service bars, may also be applied to the creators of such symbols.

The graphical messaging symbol and associated property data is then stored in the library 650. In some embodiments a prize may be awarded to symbols creators. A prize may be awarded automatically for uploading a created symbol. Alternatively prizes may be awarded based on a random process or based on assessable criteria, such as a prize awarded for every ten symbols uploaded by a creator. Once the symbol is stored any prize due is determined 660 and awarded 670 to the creator. For example, a credit amount added to the creator's credit balance stored in their subscriber account. The symbol is then made available for download 680 by other users. In some embodiments the downloading of symbols may be restricted to groups of subscribers, for example a sporting team may have a set of symbols created by team members and supporters and the set of symbols may only be accessible for download by subscribers who are also registered as members or supporters of the team.

Figure 7:
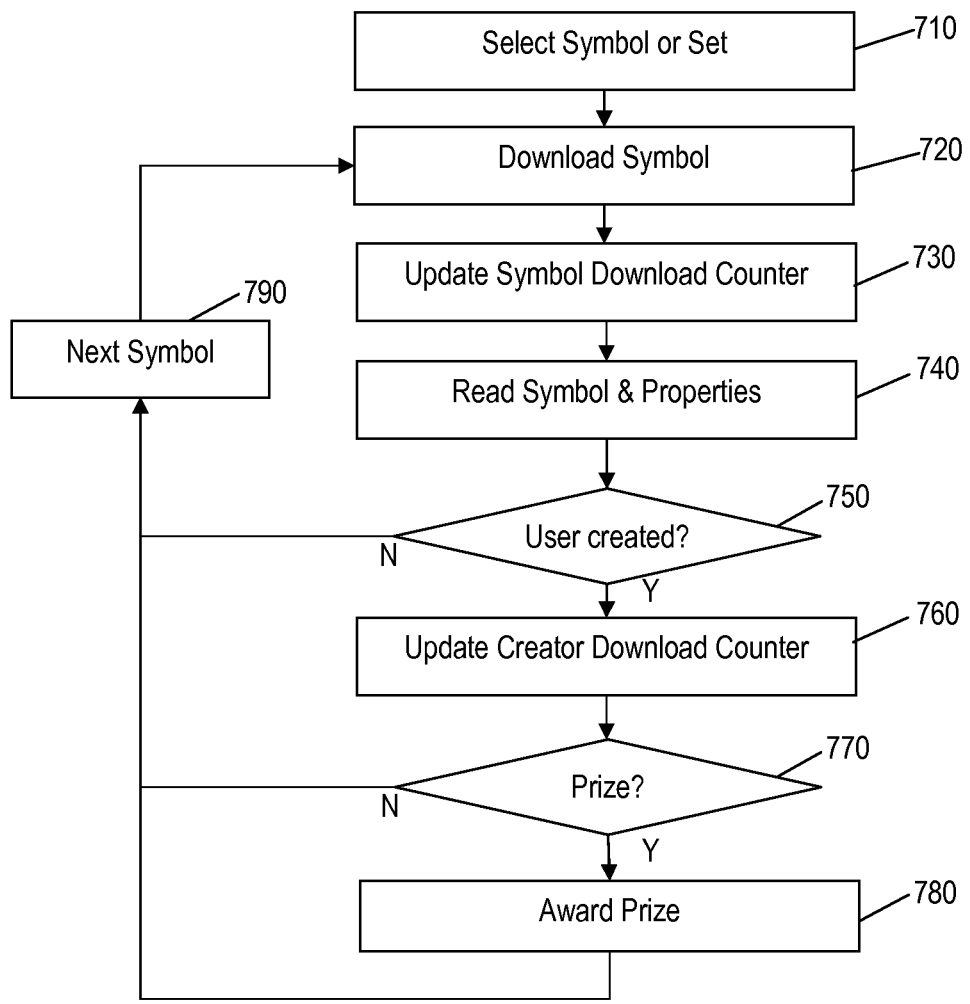
FIG. 7 is a flowchart of an example of a process for downloading symbols from a network accessible symbol library.

In an embodiment symbol popularity is monitored based on the number of times symbols are downloaded. In some embodiments the popularity of symbol creators can also be monitored. An example of a process for monitoring symbol popularity is illustrated in FIG. 7. A user selects 710 a symbol or set of symbols to download from the symbol library. For example the user may be able to browse the symbol library for individual symbols or select to download a defined symbol set. For example, a symbol set can include a plurality of symbols defined as a set based on symbol association, for example by subject matter association, such as sport, pets, relationships etc. Alternatively, sets may be defined by popularity or other common properties, such as "free download" symbols or symbols all created by the same user. Where a symbol set is downloaded the set may be downloaded in its entirety or symbol by symbol, the example shown in FIG. 7 illustrates a symbol by symbol download. Symbol properties for a selected symbol may be read prior to the symbol download and any pertinent information communicated to the downloading user, for example any charge for downloading the symbols, the number of symbols in a set, any user terminal requirements such as display colour requirements, memory requirements etc. The user may have the opportunity at this point in time to choose whether to continue or abort the download.

A selected symbol is downloaded 720 and the download counter for the symbol incremented 730, the symbol properties can then be read 740 to determine whether or not the symbol is a user created symbol 750. For a user created symbol the creator counter for the symbol creator can also be incremented 760. In some embodiments a prize can be awarded to a symbol creator based on the downloading of their symbol. Whether or not the prize is awarded may depend on prize criteria being met, for example a prize may not be payable to the creator if the symbol is downloaded as part of a symbol set, or a prize may only be awarded based on the creator counter value exceeding a given threshold value. It should be appreciated that a variety of prize rules may be provided and the prize rules applied may vary for different embodiments. Any prize to be awarded is determined 770 based on prize rules and awarded to the creator 780, for example as credits added to the credit balance value of their subscriber account. If a set of symbols is being downloaded this process will then be repeated for the next symbol 790 of the set.

In an alternative embodiment where a set of symbols is downloaded in a single action, the symbol library may update symbol download counters and any creator counters based on set download information. For example, the increment values for a symbol download counter and creator counter for an individual symbol may be smaller, say only one point, for a set download than for an individual symbol download, say ten points. This difference in value can be indicative of a greater popularity weighting given for a symbol which is selectively downloaded compared to being downloaded as part of a set.

In another embodiment an additional set download counter may be used to monitor set downloads separately from individual symbol downloads. In another embodiment the purpose for which a symbol is downloaded may also be monitored and a different counter increment applied for different purposes, for example if a symbol is downloaded for the purposes of modifying the symbol to create a further graphical messaging symbol, then a different download counter increment may be used, say five points, compared to a download counter increment, of say ten points, to use the symbol unchanged in a message. Similarly different counter increments may be applied to creator counters dependent on the purpose for the symbol download.

The popularity of a symbol creator may be based on a cumulative popularity of their created symbols. Such a cumulative popularity value may be the sum of download counter values for each symbol created by the creator. Alternatively some normalising function may be applied to the popularity of symbols created by each subscriber to prevent ranking of creators based on their popularity values being skewed in favour of a creator who creates a large number of only moderately popular symbols compared to a creator who creates only a small number of very popular symbols.

Popularity rankings for individual symbols, symbol sets, and creators may be accessible for viewing by subscribers, for example via an internet web site. Symbol set rankings may be based on a counter for whole set downloads or a cumulative total of the download counter values for individual symbols from the set. In some embodiments prizes can be awarded based on relative creator rankings. For example a prize may be awarded for the fifty highest ranking creators each week.

It should be appreciated that many variations of the method as system may be used in different embodiments and all variations are considered within the scope of the present application and within the scope of the claims which follow.

In the claims which follow and in the preceding description, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A messaging method using a mobile user terminal, the method comprising:
   creating, at the mobile user terminal, at least one graphical messaging symbol adapted to convey a meaning to a message recipient, each created graphical messaging symbol being associated with at least one property;
   preparing message content including at least one of the created graphical messaging symbols using the mobile terminal;
   sending the message to a recipient via a communication network; and
   storing a created graphical messaging symbol and the at least one associated property in a symbol library, wherein said symbol library is accessible by a plurality of users and wherein said at least one associated property includes access data defining which of said plurality of users are permitted to access said created graphical messaging symbol.

2. A method, as claimed in claim 1, wherein creating a graphical symbol comprises:
   selecting two or more base symbols from a defined base symbol set; and
   combining the two or more base symbols in a manner adapted to convey a meaning to a message recipient to form a graphical messaging symbol.

3. A method, as claimed in claim 1, wherein creating a graphical messaging symbol comprises:
   accessing a pre-existing graphical symbol adapted to convey a first meaning to a recipient; and
   modifying the pre-existing graphical symbol to create a graphical messaging symbol.

4. A method, as claimed in claim 3, wherein the modifying comprises combining the pre-existing graphical messaging symbol with one or more base symbols.

5. A method, as claimed in claim 2, wherein base symbols can be selected from a base symbol set including one or more of: geometric shapes, lines, mathematical symbols, characters, and predefined symbols.

6. A method, as claimed in claim 3, wherein accessing a pre-existing graphical symbol involves looking up the pre-existing graphical symbol in a symbol library accessible via a communication network.

7. A method, as claimed in claim 1, further comprising:
making created graphical messaging symbols available for downloading from the symbol library via a network; and
monitoring downloading of symbols from the graphical symbol library.

8. A method, as claimed in claim 7, wherein monitoring downloading of graphical symbols includes incrementing a download counter value of a download counter associated with a graphical symbol or set of graphical symbols for each download.

9. A method, as claimed in claim 6, further comprising ranking popularity of symbols or sets of symbols and presenting symbols in the library based on popularity.

10. A method, as claimed in claim 7, wherein creator data is stored for each created graphical messaging symbol, the method further comprising reading creator data for a downloaded graphical symbol and incrementing a creator counter value of a creator counter for the creator of the graphical symbol.

11. A method, as claimed in claim 10, further comprising awarding one or more prizes to symbol creators based on creator counter values.

12. A method, as claimed in claim 11, wherein prizes awarded are credits, stored in a user account, and redeemable for access to voice, data and messaging services.

13. A mobile user terminal having a processor adapted to execute a set of instructions to enable a user of the terminal to:
create at least one graphical messaging symbol adapted to convey a meaning to a message recipient, each created graphical messaging symbol being associated with at least one property;
prepare message content including at least one of the created graphical messaging symbols;
send the message to a recipient via a communication network; and
storing a created graphical messaging symbol and the at least one associated property in a symbol library, wherein said symbol library is accessible by a plurality of users and wherein said at least one associated property includes access data defining which of said plurality of users are permitted to access said created graphical messaging symbol.

14. A user terminal, as claimed in claim 13, wherein the user terminal is provided with a defined base symbol set stored in memory accessible by the mobile terminal processor and the processor is adapted to execute instructions to enable a user to create a graphical symbol by:
selecting two or more base symbols from the base symbol set; and
combining the two or more base symbols in a manner adapted to convey a meaning to a message recipient to form a graphical messaging symbol.

15. A user terminal, as claimed in claim 14, wherein the terminal is adapted to enable a user to create a graphical messaging symbol by:
accessing a pre-existing graphical symbol adapted to convey a first meaning to a recipient; and
modifying the pre-existing graphical symbol to create a graphical messaging.

16. A user terminal, as claimed in claim 15, wherein modifying the pre-existing graphical symbol comprises combining the pre-existing graphical messaging symbol with one or more base symbols.

17. A user terminal, as claimed in claim 14, wherein base symbols can be selected from a base symbol set including one or more of: geometric shapes, lines, mathematical symbols, characters, and predefined symbols.

18. A user terminal, as claimed in claim 15, adapted to access the symbol library via a communication network to look up a pre-existing graphical symbol stored therein.

19. A user terminal, as claimed in claim 13, further adapted to store a created graphical messaging symbol in a network accessible symbol library.

20. A messaging system comprising:
a network accessible symbol library for storing graphical messaging symbols; and
at least one mobile user terminal having a processor adapted to execute a set of instructions to enable a user to:
create at least one graphical messaging symbol adapted to convey a meaning to a message recipient, each created graphical messaging symbol being associated with at least one property;
prepare message content including at least one of the created graphical messaging symbols;
send the message to a recipient via a communication network; and
store created graphical messaging symbols and the at least one associated property in the symbol library, wherein said symbol library is accessible by a plurality of users and wherein said at least one associated property includes access data defining which of said plurality of users are permitted to access said created graphical messaging symbol.

21. A system, as claimed in claim 20, wherein the user terminal is also adapted to access, via the communication network, graphical messaging symbols stored in the symbol library, and download one or more graphical symbols to the user terminal for use in preparing message content or creating further graphical symbols.

22. A system, as claimed in claim 21, wherein the symbol library further comprises a monitor for monitoring downloading of graphical messaging symbols from the symbol library.

23. A system, as claimed in claim 22, wherein monitoring downloading of graphical symbols includes incrementing a download counter value of a download counter associated with a graphical symbol or set of graphical symbols for each download.

24. A system, as claimed in claim 23, wherein the monitor is further adapted to rank popularity of symbols or sets of symbols.

25. A system, as claimed in claim 24, wherein symbols are presented in the symbol library based on popularity rankings.

26. A system, as claimed in claim 23, further comprising a subscriber register in data communication with the symbol library, wherein the subscriber register stores subscriber data of registered subscribers.

27. A system, as claimed in claim 26, wherein the symbol library is adapted to store creator data for each created graphical messaging symbol, and wherein the monitor is adapted to read creator data for a downloaded graphical symbol and increment a creator counter value of a creator counter stored in the subscriber register as subscriber data for the creator of the graphical symbol.

28. A system, as claimed in claim 27, further adapted to award one or more prizes to symbol creators based on creator counter values.

29. A system, as claimed in claim 28, wherein prizes awarded are credits added to a credit balance stored in the subscriber register as subscriber data for a subscriber whereby the credits are redeemable for access to voice, data and messaging services.

30. A tangible computer readable storage medium including executable program instructions embodied in the computer readable storage medium that when executed by programmable system cause the system to perform functions that implement a mobile user terminal adapted to:
- create at least one graphical messaging symbol adapted to convey a meaning to a message recipient, each created graphical messaging symbol being associated with at least one property;
- prepare message content including at least one of the created graphical messaging symbols;
- send the message to a recipient via a communication network; and
- store a created graphical messaging symbol and the at least one associated property in a symbol library, wherein said symbol library is accessible by a plurality of users and wherein said at least one associated property includes access data defining which of said plurality of users are permitted to access said created graphical messaging symbol.

\* \* \* \* \*